A. W. Hale.
Cutting & Working Fibrous Substances.
Nº 72393.  Patented Dec. 17, 1867.

Witnesses:

Inventor

United States Patent Office.

ALBERT W. HALE, OF NEW YORK, N. Y.

Letters Patent No. 72,393, dated December 17, 1867.

IMPROVED MACHINE FOR CUTTING AND WORKING FIBROUS SUBSTANCES.

The Schedule referred to in these Letters Patent and making part of the same.

TO ALL WHOM IT MAY CONCERN:

Be it known that I, ALBERT W. HALE, of the city of New York, in the county of New York, and State of New York, have invented a new and useful Machine for Cutting and Working Fibrous and Plastic Substances; and I do hereby declare that the following is a full, clear, and exact description thereof, and of its mode or manner of operation, reference being had to the accompanying drawings, and to the letters of reference marked thereon, and making a part of this specification.

The invention consists in such a construction and arrangement of the several parts of the machine that the material to be treated shall be drawn into and forced out of the machine thoroughly mixed and cut by one continuous operation. The machine is designed to cut fibrous substances, and to work and mix soft and adhesive substances.

Figure 1:
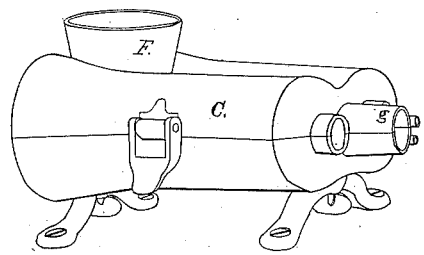
Figure 2:
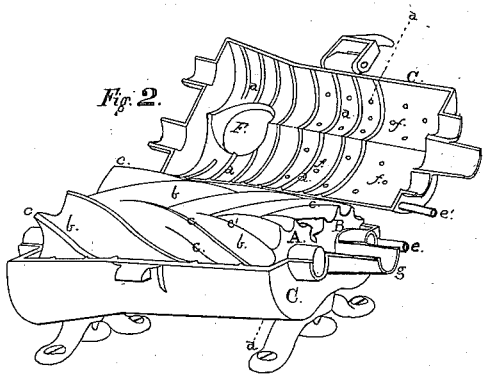
Figure 3:
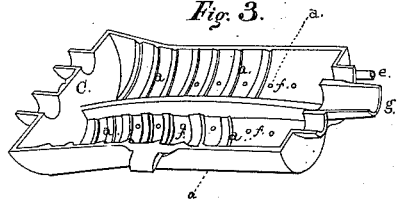
Figure 4:
Figure 5:
Figure 6:
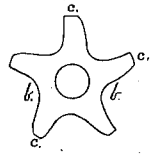
Figure 7:
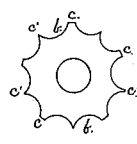
Figure 8:
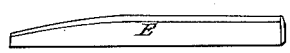
Figure 9:
Figure 10:
Figure 11:
Figure 11:
Figure 11:

Figure 1 is a general view of the machine.
Figure 2 is a view of the same, with the upper part of the case thrown back.
Figure 3 is a view of the lower part of the case.
Figure 4 is a cross-section of the upper or lower case, through $a\ a$.
Figure 5 is a view of one of the rollers.
Figure 6 is an end view of the front end of the roller.
Figure 7 is an end view of the discharge-end of the roller.
Figure 8 is a view of the knife detached.
Figures 9, 10, and 11 are end views of different moulds which can be attached to the machine to shape any plastic material worked by it.

The machine consists of two spirally-grooved or fluted rollers, A and B, placed side by side and enclosed in a case, C, which is furnished or constructed with spiral or curved ribs or grooves, $a\ a$, inclined toward the back end of the machine. The grooves or flutes $b\ b$ in the rollers may be varied in number, and decrease in depth from the front to the back end of the rollers, and the number of such grooves may be varied, as found most convenient. Such rollers revolve toward each other, and consequently in opposite directions, one roller being operated by a crank, and imparting motion to the other.

The cutting or working of the substance is effected by the action of the edges of the spiral flanges $c\ c$ of the rollers upon a knife, E, placed intermediate between the roller, and in such a position that such flanges, as the rollers are revolved, shall be continually in contact with the edge of the knife.

The grooves or flutes $b\ b$ in the rollers, as before stated, and as shown in the drawings, are of considerable depth at the front end, but decrease in depth toward the outer end. By the action of such tapering grooves the substance being cut is continually carried, as the rollers revolve, toward and against the knife E, and reduced in size, until it is cut fine enough to pass through between the case and the shallowest ends of such grooves. The shallowness of such grooves at the back ends of the rollers will be regulated according to the fineness to which it is desired the substance should be cut. The same arrangement of the parts serves to mix or work, as well as cut any substance. The reduction or working of the substance may also be regulated by the breadth, as well as the depth of the grooves in the rollers, and such breadth is decreased by increasing the number of the flanges on the rear ends of the rollers, or, in other words, by placing intermediate flanges $c'\ c'$ at and towards the rear or discharge-ends of the cylinders, between the other flanges. Such intermediate flanges generally extend about one-half the length of the cylinders. Fig. 6 shows the number of flanges and depths of the grooves at the front ends of such cylinders, and fig. 7 shows the flanges and grooves at the rear ends.

The substance to be cut or worked is carried through and discharged from the machine, partly from the action of the revolving rollers drawing any such substance in between them, and partly by the action of the spiral ribs and grooves $a\ a$ of the enclosing-case, such ribs by inclining towards the discharge-end of the machine, acting in combination with the revolving grooved rollers to carry along the substance until it is discharged.

For cutting substances which are fibrous but not plastic and adhesive, the action of the revolving rollers, so arranged with reference to the knife as to produce a shearing cut, is sufficient, in combination with the ribbed case, to secure all necessary movement or discharge of the material. But when a soft and adhesive substance, as suet, is to be cut, or a plastic material, as clay, &c., is to be worked, a somewhat peculiar construction of the rollers is required to overcome the tendency of such substances to clog in the machine or grooves, and thus stop the feed and discharge of any such substance. This tendency and difficulty I obviate and overcome by the following arrangement in construction: The flanges c c, at the feed or front end of the rollers, are expanded or made of a greater diameter than they are in the middle or at the rear ends of the cylinders, so that they lap by each other, and extend into the grooves of the adjacent cylinder, as seen in fig. 2. Such flanges at the front end of the cylinders are also made much thicker, so that the flange of one cylinder will to a greater degree fill the groove in the other cylinder, as shown in the drawings. Such flanges, however, gradually decrease in thickness, as do the rollers in diameter, for about one-third the length of the roller, from which point the thickness of the flanges increases the depth of the grooves decreases, and the diameter of the roller is constant. The rollers are thus conical for about one-third, and cylindrical for the balance of their length. This form of the rollers, partly conical and partly cylindrical, is adopted for facility of construction. The effect of the principle involved in the construction of the machine, however, is secured by making the rollers conical from end to end, or by any arrangement which affords a greater capacity of the grooves to a greater lap of the flanges at the feed than at the discharge-end of the machine. The diameter of the rollers at one end being increased by the expansion of the flanges, the case C is expanded, as shown in the figs. 1 and 2, to accommodate such increased diameter of the rollers.

As the rollers A B are revolved, the flanges c c, overlapping each other, compress and at the same time press forward any substance collected in the grooves b b, so that at every revolution of the rollers a space is left in the grooves, under the feed-funnel F, for receiving fresh material. The rollers, from their peculiar construction, and by the arranged overlapping of their flanges at the front or feed-ends, thus act or operate both to draw in the material to be cut or worked, and also continually press it forward, and thereby prevent any such material or substance, even when of a soft and adhesive or plastic nature, filling up and packing in the grooves, and thus continually make room for the reception of fresh material.

The front end d of the knife E is inclined, as shown in figs. 3 and 8, so as to be adapted to the increased diameter of the rollers at their front ends. In order to secure intimate contact between the edges of the flanges and the edge of the knife, either the surface of the conical portion of the roller or the edge of the inclined portion of the knife, as shown in figs. 3 and 8, must be curved. If the conical portion of the roller is a frustum of a cone, the edge of the inclined portion of the knife is a portion of a hyperbola. If the inclined portion of the knife is straight, the conical portion of the roller is a frustum of a hyperboloid.

In the working of plastic and adhesive substances or material, water under pressure may be introduced into the machine as a lubricator, by forming the upper and lower parts of the case of two concentric or parallel plates, as shown in section in fig. 4, into which the water is forced by means of the pipes $e\ e'$, and from which it is discharged into the machine, and upon the adhesive substance, through the perforations $f f$.

Fibrous material, after it has been cut, may be discharged from the machine through any pipe fixed to the discharge-opening $g$. Plastic materials or substances may be delivered in a square, rectangular, or other form, through a pipe, as shown in fig. 9, and afterward cut up into suitable lengths, as bricks, or may be delivered in the form of a round, semicircular, or otherwise shaped tube, as pipe-drains, tiles, &c., by the use of proper formers, as shown in figs. 10 and 11.

What I claim as my invention, and desire to secure by Letters Patent, is—

1. The making the flanges on the rolls thicker and of greater diameter at the feeding-end of the machine than they are at the delivery-end thereof, and the making such flanges to gear into or lap by each other more deeply at the feeding-end of the machine than they do at the delivery-end.

2. In combination with a machine for cutting or working soft and adhesive materials, operating substantially as described, the arrangement of a water-chamber and distributing-orifices $f f$, substantially as and for the purposes set forth.

ALBERT W. HALE.

Witnesses:
S. D. LAW,
FRED. B. SEARS.